(12) United States Patent (10) Patent No.: US 9,102,102 B2
Meyer et al. (45) Date of Patent: Aug. 11, 2015

(54) COMPOSITE STRUCTURE

(75) Inventors: Jonathan Meyer, Calne (GB); Michael Matthews, St. Arvans (GB)

(73) Assignee: Airbus Operations Limited, Bristol (GB)

( * ) Notice: Subject to any disclaimer, the term of this patent is extended or adjusted under 35 U.S.C. 154(b) by 299 days.

(21) Appl. No.: 13/641,210

(22) PCT Filed: Apr. 7, 2011

(86) PCT No.: PCT/GB2011/050687
§ 371 (c)(1),
(2), (4) Date: Oct. 15, 2012

(87) PCT Pub. No.: WO2011/128667
PCT Pub. Date: Oct. 20, 2011

(65) Prior Publication Data
US 2013/0034684 A1 Feb. 7, 2013

(30) Foreign Application Priority Data
Apr. 15, 2010 (GB) .................................. 1006257.8

(51) Int. Cl.
*B32B 5/12* (2006.01)
*B29C 70/20* (2006.01)
(Continued)

(52) U.S. Cl.
CPC .................. *B29C 70/202* (2013.01); *B64C 3/26* (2013.01); *B29L 2031/085* (2013.01);
(Continued)

(58) Field of Classification Search
CPC ...................... Y10T 428/24; Y10T 428/24058; Y10T 428/24124; Y10T 428/24174
USPC .................... 428/113, 105, 119, 98
See application file for complete search history.

(56) References Cited

U.S. PATENT DOCUMENTS

| 5,431,538 A | 7/1995 | Schmaling et al. |
| 6,405,978 B1 | 6/2002 | Dean et al. |

(Continued)

FOREIGN PATENT DOCUMENTS

| EP | 1 918 193 | 5/2008 |
| WO | WO 96/39327 | 12/1996 |

(Continued)

OTHER PUBLICATIONS

International Search Report for PCT/GB2011/050687 mailed Aug. 16, 2011.

(Continued)

*Primary Examiner* — Brent O'Hern
(74) *Attorney, Agent, or Firm* — Nixon & Vanderhye P.C.

(57) ABSTRACT

A structure comprising a plurality of plies of fiber-reinforced composite material, each ply having a ply orientation defined by a principal stiffness direction of the ply. The structure has a first region and a second region, each region comprising N1 primary plies, N4 cross plies with a ply orientation substantially perpendicular to the primary plies, N2 positive-angled bias plies with a ply orientation at a positive acute angle to the primary plies, and N3 negative-angled bias plies with a ply orientation substantially perpendicular to the positive-angled bias plies. The ply orientation of the primary plies in each region is more closely aligned with a primary axis of the structure than the cross plies or the bias plies. N1=N4 in the first region but not in the second N region, and N2=N3 in the second region but not in the first region. In each of the two regions, one ply set is balanced and the other ply set is unbalanced. This provides a compromise between the advantages of using un-balanced ply sets, for instance to provide bending torsion coupling, and the disadvantage that un-balanced ply sets can introduce thermally induced distortion during manufacture.

14 Claims, 7 Drawing Sheets

(51) Int. Cl.
*B64C 3/26* (2006.01)
*B29L 31/08* (2006.01)
*B29L 31/30* (2006.01)

(52) U.S. Cl.
CPC ....... *B29L 2031/3085* (2013.01); *Y02T 50/433* (2013.01); *Y10T 428/24* (2015.01); *Y10T 428/24058* (2015.01); *Y10T 428/24124* (2015.01); *Y10T 428/24174* (2015.01)

(56) References Cited

U.S. PATENT DOCUMENTS

| | | | |
|---|---|---|---|
| 6,641,893 B1 * | 11/2003 | Suresh et al. | 428/105 |
| 2004/0074592 A1 | 4/2004 | Ashton et al. | |
| 2005/0163975 A1 | 7/2005 | Chen et al. | |
| 2010/0136293 A1 * | 6/2010 | Kubryk et al. | 428/156 |
| 2011/0004451 A1 | 1/2011 | Krog | |

FOREIGN PATENT DOCUMENTS

| | | | | |
|---|---|---|---|---|
| WO | WO 99/39976 | | 8/1999 | |
| WO | WO 9939976 A1 | * | 8/1999 | ............... B64C 1/12 |
| WO | WO 2009/133382 | | 11/2009 | |

OTHER PUBLICATIONS

Written Opinion of the International Searching Authority mailed Aug. 16, 2011.

K. Mason, "Anisotropic Wind Blade Design Expected to Reduce Wind-Energy Costs", Composites World, Nov. 2004, retrieved Aug. 16, 2010, 5 pages.

Search Report for GB 1006257.8 dated Aug. 11, 2010.

* cited by examiner

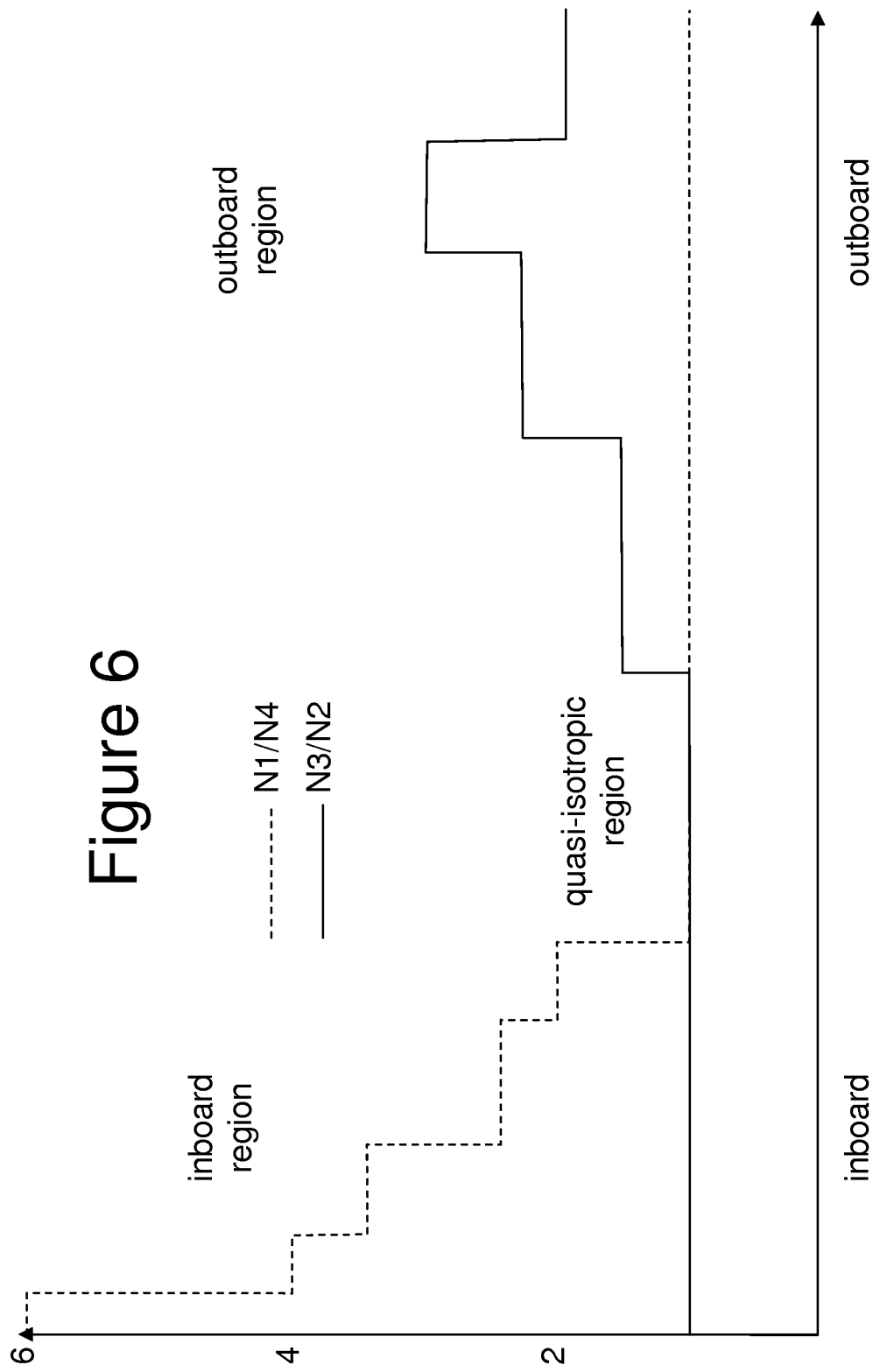

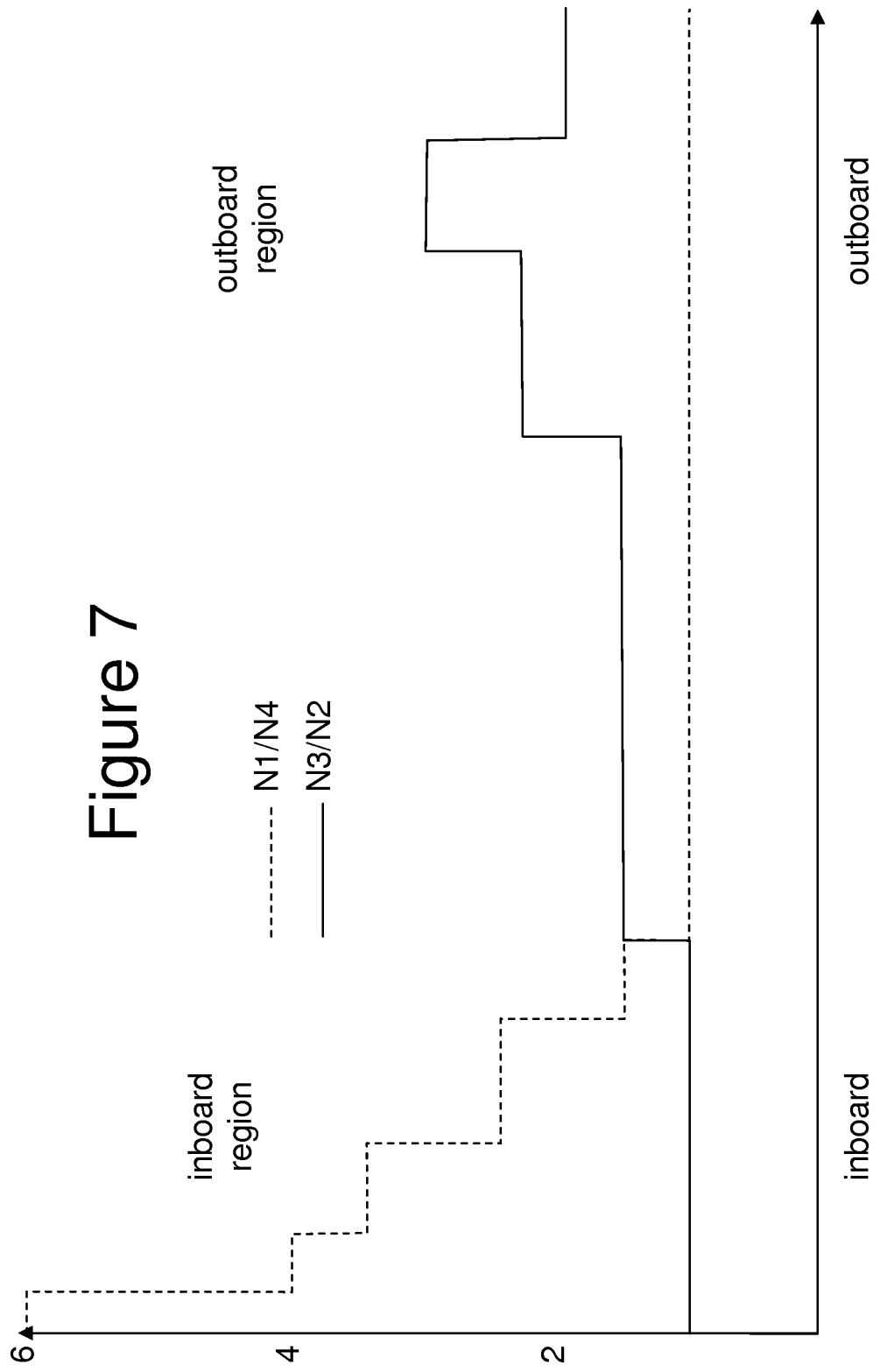

COMPOSITE STRUCTURE

This application is the U.S. national phase of International Application No. PCT/GB2011/050687 filed 7 Apr. 2011 which designated the U.S. and claims priority to GB 1006257.8 filed 15 Apr. 2010, the entire contents of each of which are hereby incorporated by reference.

FIELD OF THE INVENTION

The present invention relates to a structure comprising a plurality of plies of fibre-reinforced composite material.

BACKGROUND OF THE INVENTION

In composite structures of this type, each ply has a ply orientation defined by principal stiffness direction of the ply. For example the structure may have a lay-up with primary plies, cross plies with a ply orientation substantially perpendicular to the primary plies, positive-angled bias plies with a ply orientation at a positive acute angle to the primary plies, and negative-angled bias plies with a ply orientation substantially perpendicular to the positive-angled bias plies. Typically the ply orientation of the primary plies is more closely aligned with a principal bending axis of the structure than the cross plies or the bias plies. It is known to vary the lay-up in order to achieve desired physical characteristics. For instance the proportion of primary plies may be increased in order to increase the stiffness of the structure along its principal bending axis. In such a situation the primary plies and cross plies are said to be "un-balanced". Typically the number of positive-angled and negative-angled bias plies is equal in order to prevent undesired bending torsion coupling which can lead to distortion of the part after curing due to the mismatch in thermal expansion between the positive and negative-angle bias plies. In such a situation the bias plies are said to be "balanced".

SUMMARY OF THE INVENTION

A first aspect of the invention provides a structure comprising a plurality of plies of fibre-reinforced composite material, each ply having a ply orientation defined by a principal stiffness direction of the ply, the structure having a first region and a second region, each region comprising N1 primary plies, N4 cross plies with a ply orientation substantially perpendicular to the primary plies, N2 positive-angled bias plies with a ply orientation at a positive acute angle to the primary plies, and N3 negative-angled bias plies with a ply orientation substantially perpendicular to the positive-angled bias plies. The ply orientation of the primary plies in each region is more closely aligned with a primary axis of the structure than the cross plies or the bias plies. N1=N4 in the first region but not in the second region, and N2=N3 in the second region but not in the first region.

In each of the two regions, one ply set is balanced and the other ply set is un-balanced. This provides a compromise between the advantages of using un-balanced ply sets (for instance to provide bending torsion coupling or greater stiffness in one bending direction) and the disadvantage that un-balanced ply sets can introduce thermally induced distortion during manufacture.

The structure typically comprises a quasi-isotropic third region in which N1=N4 N2=N3. Such a quasi-isotropic region will be preferred in most cases in order to provide a smooth transition between the regions, but it is not strictly essential.

The fibres in each ply may be curved but more preferably they are substantially straight at least in the first and second regions.

In general, the principal stiffness direction of each ply will be defined by the average direction of the fibres within the ply. Each ply may have fibres running in different directions, but more typically the fibres in each ply run at least predominantly in a single direction which will be aligned the principle stiffness direction of the ply.

The cross plies have a ply orientation substantially perpendicular to the primary plies. Preferably the primary and cross plies are within 5° of being perpendicular, i.e. the angle between them can vary between 85° and 95°.

The bias plies also have substantially perpendicular ply orientations. Preferably the bias plies are within 5° of being perpendicular, i.e. the angle between them can vary between 85° and 95°.

Typically the bias plies have a ply orientation at +/−45° to the primary plies, although other angles are possible.

As well as having +/−45° plies the structure may have additional bias plies at other angles. However, preferably the structure has only four ply orientations, at least in the first and second regions, in order to simplify the design.

Typically the ply orientation of the primary plies in the first region is substantially parallel with the ply orientation of the primary plies in the second region, although they may be different.

Typically the ply orientation of the bias plies in the first region is substantially parallel with the ply orientation of the bias plies in the second region, although they may be different.

The structure may be a skin panel for forming an outer aerodynamic surface of a wing, wind turbine blade or other aerodynamic structure. Alternatively the structure may comprise a web and a flange extending laterally from the web, wherein the first region is in the flange of the spar and the second region is in the web of the spar.

The structure may comprise an aerodynamic structure such as a wing or wind turbine blade.

The primary axis can be chosen arbitrarily, for instance it may be the length axis of the structure, the principal bending axis of the structure, or in the case of an aerodynamic structure its quarter-chord line.

Preferably, although not exclusively, the structure is a cantilevered structure with a root mounted to a support structure and a primary axis extending outboard from the root, the first region being an outboard region which is positioned further outboard from the root than the second region, the bias plies inducing a bending torsion coupling in the outboard region.

BRIEF DESCRIPTION OF THE DRAWINGS

Embodiments of the invention will now be described with reference to the accompanying drawings, in which:

FIG. 6 is a graph schematically illustrating how the lay-up might vary in a span-wise direction, according to a second embodiment; and FIG. 7 is a graph schematically illustrating how the lay-up might vary in a span-wise direction, according to a third embodiment.

DETAILED DESCRIPTION OF EMBODIMENT(S)

Figure 1:
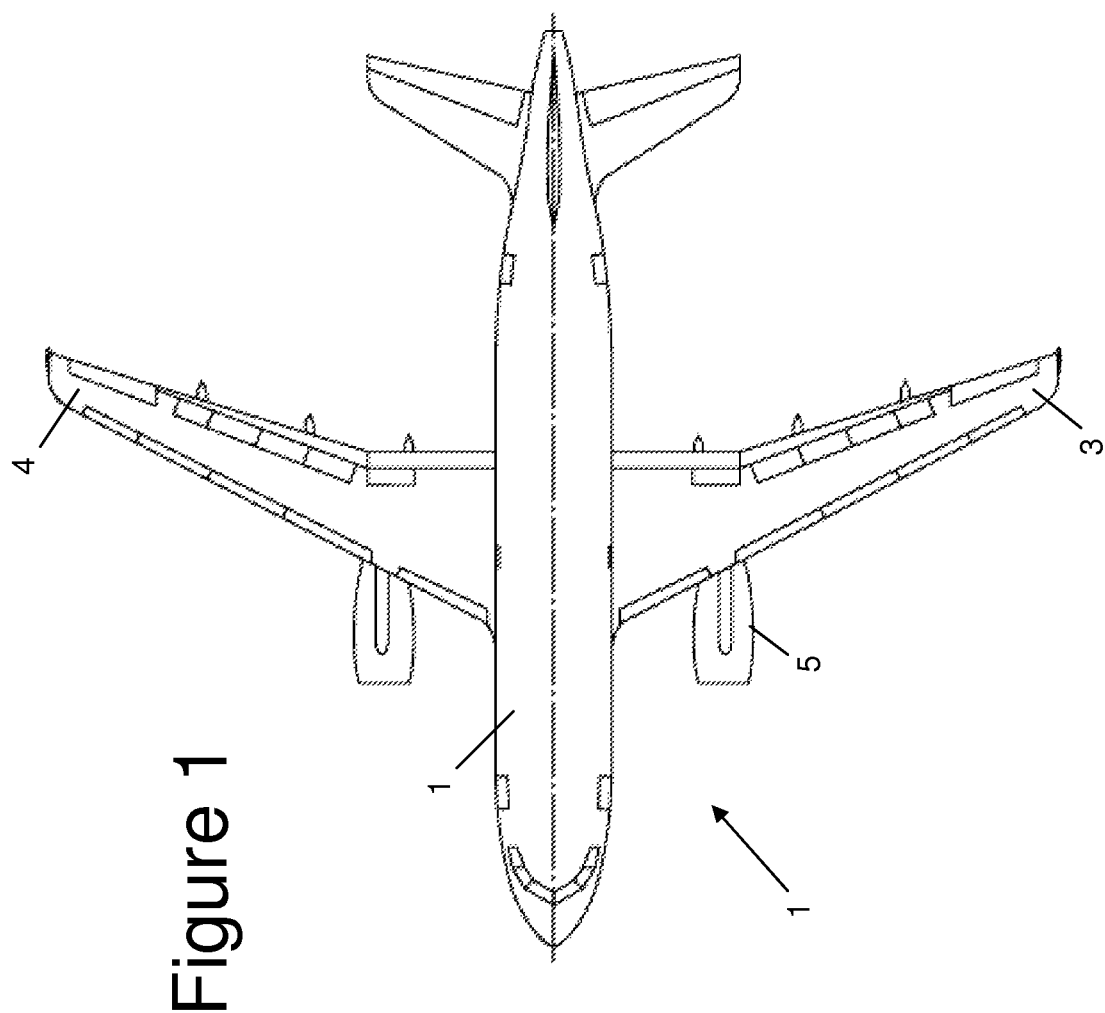
FIG. 1 is a plan view of an aircraft.

FIG. 1 is a plan view of an aircraft 1 with a fuselage 2, and port and starboard wings 3, 4. The wings 3, 4 are cantilevered structures each with a root mounted to the fuselage 2 and a principal bending axis extending outboard from the root to a free wing tip.

Figure 2:
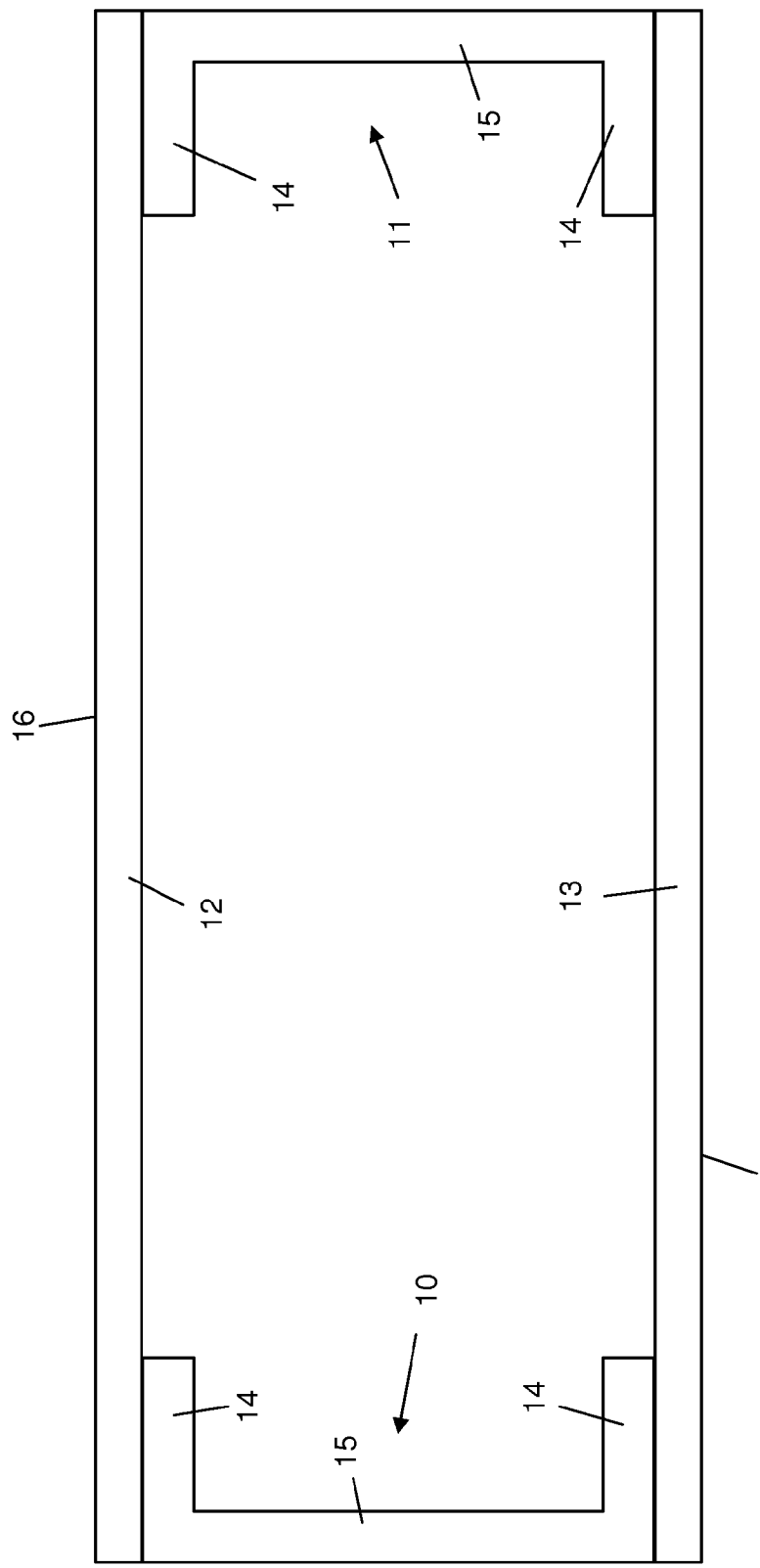
FIG. 2 is a sectional view of a wing box taken along a chord-wise section.

The principal structural element of each wing is a wing box shown in FIG. 2. Note that the wing box is shown schematically in FIG. 2 which omits various control surfaces (flaps, slats etc) and other details shown in FIG. 1. The wing box comprises a pair of spars 10,11 and a pair of skins 12,13 which each run along the full length of the wing box (perpendicular to the sectional view of FIG. 2). Each skin 12,13 has an outer surface 16 which forms an aerodynamic outer surface of the wing. Each spar has a pair of flanges 14 which are bolted to the skins 12,13, and a shear web 15 extending between the skins. The skins may also have attached stiffeners or stringers, which may be straight or curved in order to match the principal stiffness direction of the skin, or the skin may be a sandwich structure with a core material. The wing box may also have chordwise ribs. All of these are excluded from the diagram for simplicity.

Figure 3:
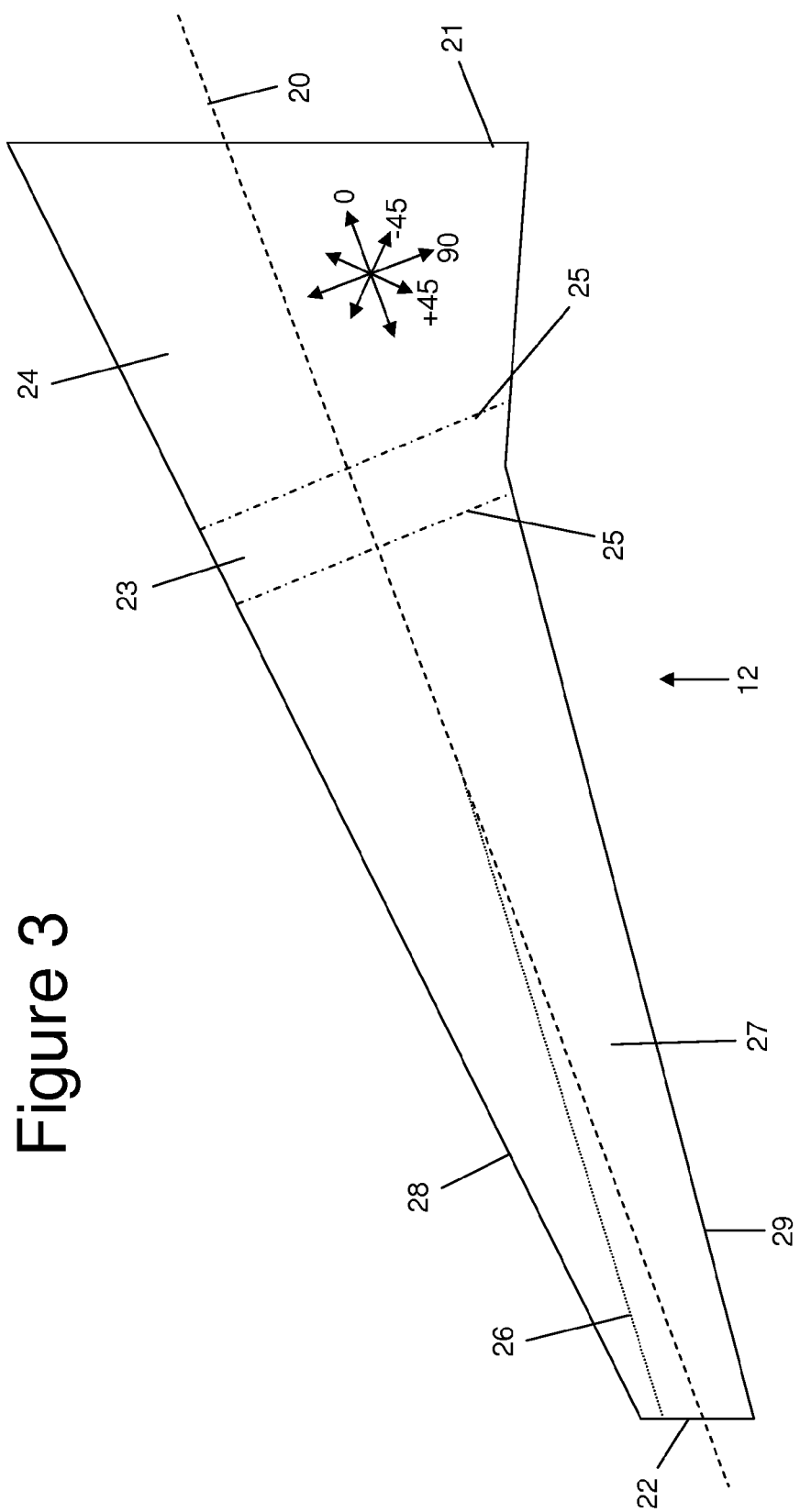
FIG. 3 is a plan view of a wing skin.

FIG. 3 is a plan view of the upper wing skin 12. The skin 12 is formed from a plurality of plies of carbon fibre-reinforced composite material, such as thermosetting epoxy resin. Each ply contains substantially straight and uni-directional fibres (i.e. the fibres run in one direction only) and the direction of the fibres within the ply define its ply orientation. By convention the fibre direction is defined relative to a primary axis 20 of the wing, typically its principle bending axis or quarter chord line. Thus for example a ply with fibres which run parallel to the axis 20 is denoted as a 0° ply, and so on.

The thickness of the skin varies along its length and across its width. For instance, in general terms, the thickness of the skin decreases in a span-wise direction. Also, the skin tends to be thicker in the pylon region 23 where the wing must support the weight of an engine 5 (shown in FIG. 1). The skin will also be thicker in areas around the interface with the spars. Thickness variations are achieved by adding and removing plies from the stack.

Figure 4:
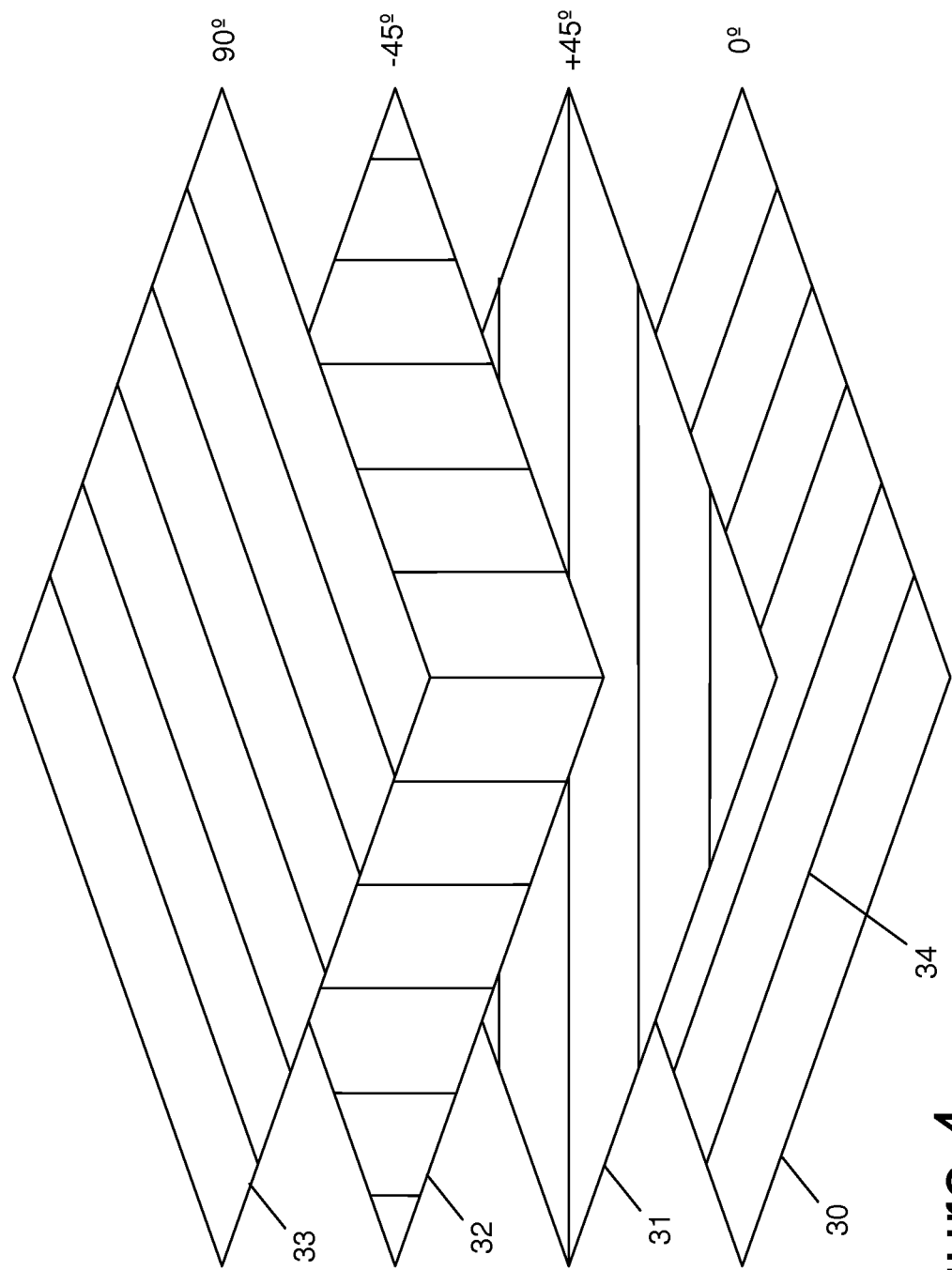
FIG. 4 is a schematic view of a composite stacking sequence.

The constitution of the skin is defined at each point by a stacking sequence of ply orientations. For instance FIG. 4 gives a simplistic example of a stacking sequence with just four plies 30-33. The ply orientation of each ply is indicated schematically in FIG. 4 by a set of fibres 34 running along the ply. The ply 30 is a 0° (primary) ply and the number of primary plies in the stacking sequence is denoted N1. The ply 33 is a 90° (cross) ply and the number of cross plies in the stacking sequence is denoted N4. The ply 31 is a +45° (positive-angled bias) ply and the number of positive-angled bias plies in the stacking sequence is denoted N2. The ply 32 is a −45° (negative-angled bias) ply and the number of negative-angled bias plies in the stacking sequence is denoted N3.

The stack of FIG. 4 has a lay-up which can be denoted N1/N2/N3/N4=1/1/1/1 or more conventionally in terms of ply percentages P(0°)/P(+45°)/P(−45°)/P(90)=25/25/25/25. In this case N1=N4 so the primary and cross plies are said to be "balanced". Similarly N2=N3 so the bias plies are also balanced. The stacking sequence of FIG. 4 is also said to be un-symmetric, because it is not mirror symmetric about its centre.

The primary plies, being closely aligned with the principal bending axis 20, control the bending stiffness of the skin along the principal bending axis 20. The cross plies are principally used to prevent failure of the skin in bolted areas. The bias plies lend torsional stiffness to the structure.

Returning to FIG. 3, the skin has an inboard region 24 towards the root 21 in which there are significantly more primary plies than cross plies (i.e. N1>N4) so these plies are un-balanced. Since the ply orientation of the primary plies is more closely aligned with the principal bending axis 20 than the cross plies or the bias plies, this has the effect of increasing the bending stiffness of the skin along the principal bending axis 20 in this inboard region 24. A problem with un-balancing the primary and cross plies is that this can cause distortion due to thermal effects during the cure process. That is, as the plies are heated/cooled during the cure process they tend to expand/contract preferentially at right angles to the fibre direction and if the plies are not balanced they may not return to their original size and shape after cool-down. To minimise distortion of this kind, the bias plies are balanced (i.e. N2=N3) in the inboard region 24. By way of example the lay-up in this region might be P(0°)/P(+45°)/P(−45°)/P(90°)= 60/15/15/10 at its inboard end.

Moving outboard on the wing from the root, 0° plies are progressively dropped until at some point in the mid-span the lay-up is quasi-isotropic, that is P(0°)/P(+45°)/P(−45°)/P(90°)=25/25/25/25, or equivalently N1=N2=N3=N4. By way of example this quasi-isotropic region may be in the pylon region 23, bounded by lines 25 which may be straight chordwise lines as shown schematically in FIG. 3, or more likely a more complex shape. The pylon region 23 may be the best region for this quasi-isotropic transition zone, since sizing for bolted joints is the dominant sizing factor here.

Moving further outboard on the wing from the quasi-isotropic region, the bias plies become increasingly un-balanced to introduce local bending/torsion. This is done by progressively dropping +45° plies so that N3>N2 and the principal stiffness direction 26 of the skin moves forward of its bending axis 20. As a result the outboard region 27 will twist under load so that the leading edge 28 moves down relative to the trailing edge 29, thus providing passive aero-elastic load alleviation. The primary and cross plies are kept balanced (i.e. N1=N4) in this outboard region 27 to minimise distortion of the kind described above. Since the bending moment is less in the outboard region 27, a loss of stiffness along the bending axis 20 is an acceptable compromise in return for the advantages in terms of minimising distortion. By way of example the lay-up in this region might be P(0°)/P(+45°)/P(−45°)/P(90°)=20/15/45/20.

Figure 5:
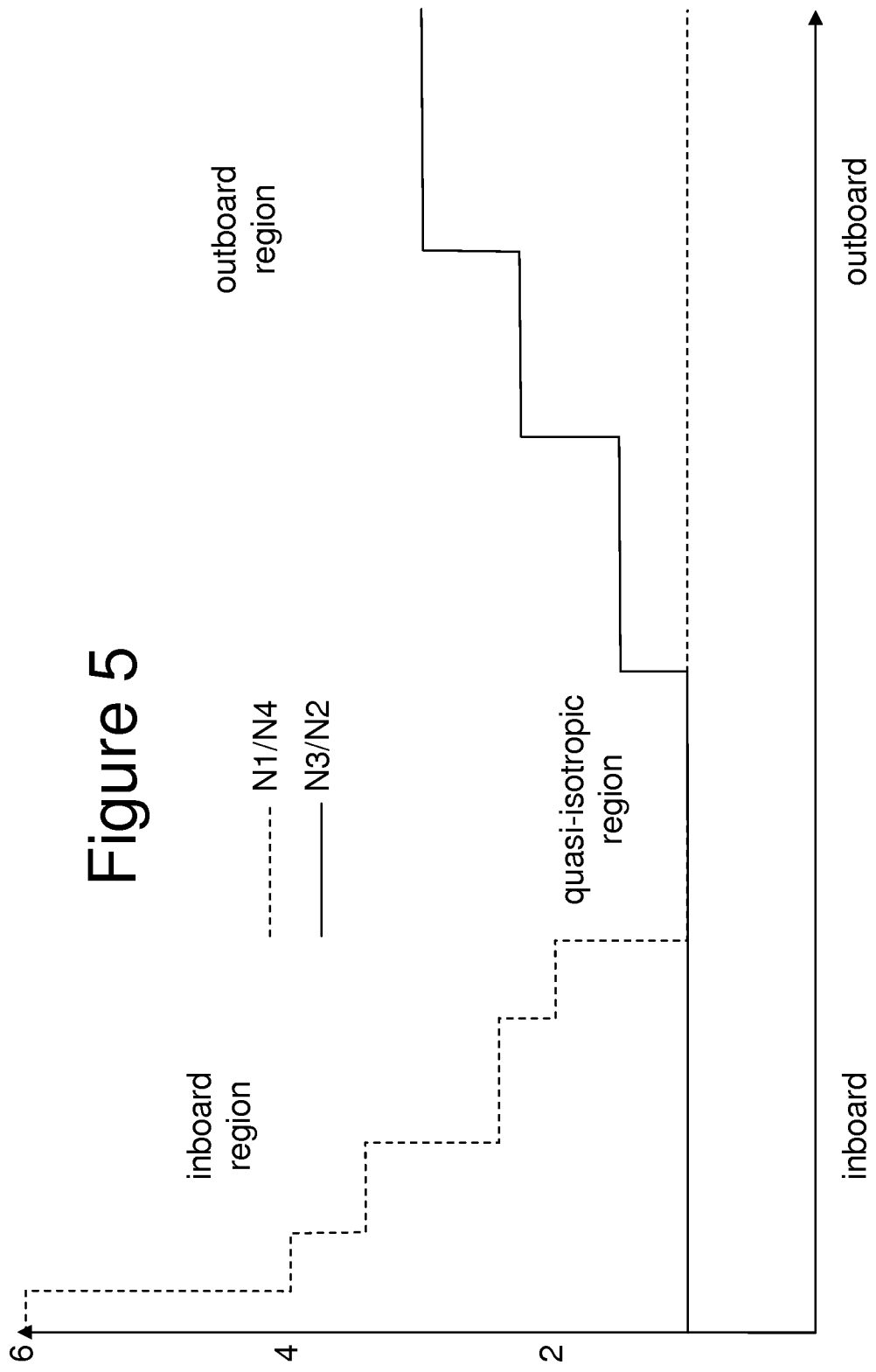
FIG. 5 is a graph schematically illustrating how the lay-up might vary in a span-wise direction, according to a first embodiment.

FIG. 5 is a graph which schematically illustrates how the lay-up might vary in a span-wise direction along the skin. The dashed line shows the ratio N1/N4 and the solid line shows the ratio N3/N2. At the inboard end N1/N4 is at a maximum and decreases outboard in a series of steps as the 0° plies are dropped off until N1=N4 in the quasi-isotropic region. At the outboard end N3/N2 is at a maximum and decreases inboard in a series of steps as the +45° plies are added until N3=N2 in the quasi-isotropic region. Note that FIG. 5 is highly schematic and in practice there will most likely be a higher number of smaller steps. Also the ratios N1/N4 and N3/N2 may go up and down within each region. For instance N3/N2 may be at a maximum at an outboard region of the wing as shown in FIG. 6 and then decrease in a step towards the wing tip and in successive steps towards the root of the wing. Also a quasi-isotropic lay-up may be beneficial at the extreme wing tip particularly if a winglet is attached there.

A quasi-isotropic region will be preferred as in FIGS. 5 and 6 in most cases in order to minimise the number of plies that need to be dropped at a single point, but it is not strictly essential. See FIG. 7 for an example in which there is no quasi-isotropic region.

Returning to FIG. 2, each spar has a shear web 15 and a pair of flanges 14 extending laterally from the web. The flanges 14 have significantly more primary plies than cross plies (i.e. N1>N4) so these plies are unbalanced. Since the ply orientation of the primary plies is more closely aligned with the principal bending axis 20 than the cross plies or the bias plies, this has the effect of increasing the bending stiffness of the flanges along the principal bending axis 20. To minimise distortion during manufacture, the bias plies are balanced (i.e. N2=N3) in the flanges 24. By way of example the lay-up in the flanges 14 might be P(0°)/P(+45°)/P(−45°)/P(90°=44/22/22/12.

The shear web 15 contains predominantly bias plies, and the bias plies are unbalanced so that N3>N2. By unbalancing the bias plies, the spar can be made stiffer in the upward bending direction than in the downward bending direction. The primary and cross plies are kept balanced (i.e. N1=N4) in the web 15 to minimise distortion during manufacture. By way of example the lay-up in the web 15 might be P(0°)/P(+45°)/P(−45°)/P(90°=15/25/45/15.

Although the invention has been described above with reference to one or more preferred embodiments, it will be appreciated that various changes or modifications may be made without departing from the scope of the invention as defined in the appended claims.

The invention claimed is:

1. A structure comprising a plurality of plies of fiber reinforced composite material, each ply having a ply orientation defined by a principal stiffness direction of the ply, the structure having a first region and a second region, each region comprising N1 primary plies, N4 cross plies with a ply orientation substantially perpendicular to the primary plies, N2 positive-angled bias plies with a ply orientation at a positive acute angle to the primary plies, and N3 negative-angled bias plies with a ply orientation substantially perpendicular to the positive-angled bias plies;
    wherein the ply orientation of the primary plies in each region is more closely aligned with a primary axis of the structure than the cross plies or the bias plies;
    wherein N1=N4 in the first region but not in the second region;
    wherein N2=N3 in the second region but not in the first region; and
    wherein N3/N2 decreases in successive steps across the first region.

2. The structure of claim 1 further comprising a third region, the third region comprising N1 primary plies, N4 cross plies with a ply orientation substantially perpendicular to the primary plies, N2 positive-angled bias plies with a ply orientation at a positive acute angle to the primary plies, and N3 negative-angled bias plies with a ply orientation substantially perpendicular to the positive-angled bias plies;
    wherein the ply orientation of the primary plies in the third region is more closely aligned with a primary axis of the structure than the cross plies or the bias plies;
    wherein N1=N4 in the third region; and
    wherein N2=N3 in the third region.

3. The structure of claim 1 wherein the fibers in each ply are substantially straight and unidirectional, at least in the first and second regions.

4. The structure of claim 1 wherein the ply orientation of the primary plies in the first region is substantially parallel with the ply orientation of the primary plies in the second region.

5. The structure of claim 1 wherein the ply orientation of the bias plies in the first region is substantially parallel with the ply orientation of the bias plies in the second region.

6. The structure of claim 1 wherein each region has only four ply orientations.

7. The structure of claim 1 wherein the structure is a skin panel for forming an outer aerodynamic surface of a wing, wind turbine blade or other aerodynamic structure.

8. The structure of claim 1 wherein the structure is an aerodynamic structure including at least one of a wing and a wind turbine blade.

9. The structure of claim 1 wherein the composite material is a thermosetting or thermoplastic composite material.

10. The structure of claim 1 wherein N1/N4 decreases in a series of steps across the second region.

11. A spar comprising a web and a flange extending laterally from the web, the spar comprising a plurality of plies of fiber reinforced composite material, each ply having a ply orientation defined by a principal stiffness direction of the ply, the spar having a first region and a second region, each region comprising N1 primary plies, N4 cross plies with a ply orientation substantially perpendicular to the primary plies, N2 positive-angled bias plies with a ply orientation at a positive acute angle to the primary plies, and N3 negative-angled bias plies with a ply orientation substantially perpendicular to the positive-angled bias plies;
    wherein the ply orientation of the primary plies in each region is more closely aligned with a primary axis of the spar than the cross plies or the bias plies;
    wherein N1=N4 in the first region but not in the second region;
    wherein N2=N3 in the second region but not in the first region, and
    wherein the first region is in the web of the spar and the second region is in the flange of the spar.

12. A structure comprising a plurality of plies of fiber reinforced composite material, each ply having a ply orientation defined by a principal stiffness direction of the ply, the structure having a first region and a second region, each region comprising N1 primary plies, N4 cross plies with a ply orientation substantially perpendicular to the primary plies, N2 positive-angled bias plies with a ply orientation at a positive acute angle to the primary plies, and N3 negative-angled bias plies with a ply orientation substantially perpendicular to the positive-angled bias plies;
    wherein the ply orientation of the primary plies in each region is more closely aligned with a primary axis of the structure than the cross plies or the bias plies;
    wherein N1=N4 in the first region but not in the second region;
    wherein N2=N3 in the second region but not in the first region; and
    wherein the structure is a cantilevered structure with a root mounted to a support structure and a primary axis extending outboard from the root, the first region being an outboard region which is positioned further outboard from the root than the second region, the bias plies inducing a bending torsion coupling in the outboard region.

13. The structure of claim 12 wherein N1/N4 decreases in a series of steps across the second region.

14. The structure of claim 12 wherein N3/N2 decreases in a series of steps across the first region.

\* \* \* \* \*